United States Patent
Gerlach et al.

(10) Patent No.: US 8,049,492 B2
(45) Date of Patent: Nov. 1, 2011

(54) POSITION MEASURING APPARATUS

(75) Inventors: Timo Gerlach, Hannover (DE); Mike Heurich, Apelern (DE); Tino Wiggers, Seelze (DE)

(73) Assignee: WABCO GmbH, Hannover (DE)

( * ) Notice: Subject to any disclaimer, the term of this patent is extended or adjusted under 35 U.S.C. 154(b) by 175 days.

(21) Appl. No.: 12/384,372

(22) Filed: Apr. 2, 2009

(65) Prior Publication Data

US 2009/0256554 A1 Oct. 15, 2009

(30) Foreign Application Priority Data

Apr. 11, 2008 (DE) .................. 10 2008 018 432

(51) Int. Cl.
*G01B 7/14* (2006.01)
*G01B 7/30* (2006.01)
(52) U.S. Cl. ............... 324/207.24; 324/207.25
(58) Field of Classification Search ......... 324/173–174, 324/207.24–207.26
See application file for complete search history.

(56) References Cited

U.S. PATENT DOCUMENTS

| | | | | |
|---|---|---|---|---|
| 5,564,770 A * | 10/1996 | Smith et al. | ................. | 296/95.1 |
| 6,666,784 B1 * | 12/2003 | Iwamoto et al. | .............. | 474/109 |
| 7,036,791 B2 * | 5/2006 | Wiese | ...................... | 251/129.04 |
| 7,423,421 B2 * | 9/2008 | Reichert et al. | .......... | 324/207.24 |
| 7,550,966 B2 * | 6/2009 | Kraft | ........................ | 324/207.25 |
| 2007/0182403 A1 * | 8/2007 | von Hayn et al. | ........ | 324/207.24 |

\* cited by examiner

*Primary Examiner* — Huy Q Phan
*Assistant Examiner* — Joshua Benitez
(74) *Attorney, Agent, or Firm* — Kramer Levin Naftalis & Frankel LLP

(57) ABSTRACT

A position measuring apparatus includes (a) a sleeve that has an open first end and a second end opposite the first end, (b) a guide pin guided at least partly in the sleeve, (c) a spring, (d) a linear magnetic field sensor and (e) a magnet disposed adjacent to the linear magnetic field sensor. To avoid wear even in the presence of large temperature fluctuations, the magnet is disposed on a face of the guide pin facing the second end of the sleeve, and the spring is disposed between the second end of the sleeve and the magnet such that the spring urges the magnet against the guide pin.

11 Claims, 2 Drawing Sheets

Fig. 1

POSITION MEASURING APPARATUS

FIELD OF THE INVENTION

The present invention relates generally to a position measuring apparatus of the type having (a) a sleeve that has an open first end and a second end disposed opposite the first end, (b) a guide pin guided at least partly in the sleeve, (c) a spring, (d) a linear magnetic field sensor and (e) a magnet disposed adjacent to the linear magnetic field sensor.

BACKGROUND OF THE INVENTION

Position measuring apparatuses are used, for example, in gear actuators, for the purpose of sensing the position of a gear rod of a gearbox associated with the gear actuator. A disadvantage of conventional position measuring apparatuses is that they wear with time and deliver less accurate measured position data. This is the case, in particular, if the position measuring apparatus is exposed to large temperature fluctuations.

SUMMARY OF THE INVENTION

Generally speaking, in accordance with embodiments of the present invention, an improved position measuring apparatus is provided which overcomes disadvantages associated with conventional position measuring apparatuses.

The position measuring apparatus according to the present invention includes the known features of (a) a sleeve that has an open first end and a second end opposite the first end, (b) a guide pin guided at least partly in the sleeve, (c) a spring, (d) a linear magnetic field sensor and (e) a magnet disposed adjacent to the linear magnetic field sensor. However, in accordance with embodiments of the present invention, the magnet is disposed on a face of the guide pin facing the second end of the sleeve, and the spring is disposed between the second end of the sleeve and the magnet such that the spring urges the magnet against the guide pin and, thus, fixes it relative to the guide pin along a longitudinal direction of the guide pin.

There is no gap between the magnet and the guide pin, regardless of the temperature. The position of the magnet relative to the guide pin is therefore constant, and so high measurement accuracy is durably achieved. Moreover, because the spring always urges the magnet against the guide pin, a play-free connection between the magnet and the guide pin is assured.

Since temperature fluctuations do not lead to internal forces, the inventive position measuring apparatus has a much longer useful life in comparison with conventional position measuring apparatuses.

Additionally, a small gap can be adjusted between the magnet and the linear magnetic field sensor, since no forces are caused by temperature-induced stresses and, advantageously, no compensation by tolerances is necessary.

Within the scope of the description hereinafter, the feature that the guide pin is guided at least partly in the sleeve is to be understood to mean that it is possible but not necessary for the guide pin to be in contact with the sleeve along its length in longitudinal direction. Depending on a maximum stroke to be sensed with the position measuring apparatus, the guide pin is guided in the sleeve such that it does not become jammed in any operating condition.

Also, the feature that the magnet is disposed on a face of the guide pin facing the second end is to be understood to mean that it is possible but not necessary for the magnet to rest on the guide pin. For example, it is possible for the guide pin to have a guide slot, which is located at its end facing the second end and in which the magnet is seated. In particular, the magnet is disposed such that the spring exclusively urges the magnet in longitudinal direction against the guide pin.

It is desirable for one end of the spring to urge against the magnet and for its other end to be fastened in the vicinity of the second end of the sleeve. For example, the sleeve is closed at its second end and the spring bears against the closed end.

The magnet is, preferably, an annular magnet and has a central aperture, while the guide pin has a guide core, which passes through the central aperture. In this way, the magnet is safely secured against radial displacement relative to the guide pin, while movement in longitudinal direction of the guide pin is not suppressed. This results in slight wear and, thus, a long useful life.

Preferably, the annular magnet has an outside diameter that is smaller by a small amount, especially by less than 100 µm, than an inside diameter of the sleeve at a point adjacent to the annular magnet. Particularly small tolerances are possible, since temperature differences do not lead to any mechanical forces. It is therefore possible to provide the apparatus components with particularly small tolerance relative to one another.

In a preferred embodiment, the spring is a helical spring and has an outside diameter that is smaller by a small amount, especially by less than 100 µm, than an inside diameter of the sleeve at a point adjacent to the helical spring.

A particularly favorable construction is obtained when the annular magnet, the spring and the guide core are disposed coaxially.

Also, according to a preferred embodiment, the sleeve has, adjacent to its open end, a latching projection, which is designed such that the guide pin is held in the sleeve. The latching projection is designed such that a latching resistance of the latching projection must first be overcome in order to introduce the guide pin into the sleeve. If the guide pin is introduced partly or completely into the sleeve, the latching projection snaps into place. If the guide pin is received in the sleeve, the latching projection does not exert any radial force on the guide pin. In order to extract the guide pin from the sleeve, however, the residual resistance of the latching projection must be overcome once again. Thereby, the guide pin is held securely in the sleeve.

Preferably, the guide pin has, adjacent to the latching projection, a latching bead for cooperation with the latching projection. In this way, the latching pin is held securely in the sleeve.

Furthermore, according to a preferred embodiment, the position measuring apparatus comprises a housing in which the sleeve is formed, the linear magnetic field sensor being disposed in the housing, for example, by injection molding. In this case, the position measuring apparatus is a closed unit and can be easily integrated into a larger unit. For this purpose, the housing is merely joined to the larger unit.

The present invention additionally encompasses a gear actuator having the position measuring apparatus described herein; it also encompasses a gearbox. With respect to the gear actuator, the guide pin is disposed such that it is brought into contact with a gear rod at an end remote from the spring. This spring is preferably disposed such that it simultaneously urges the guide pin against the gear rod or a connecting element for the gear rod. With respect to the gearbox, it is provided with at least one gear rod, which, via its end face, is in contact with the guide pin. Such contact may be but does not necessarily have to be direct. In this way, it is possible for transmission elements to be disposed between the end face of the gear rod and the guide pin in order to transmit a movement of the guide rod to the guide pin.

Accordingly, it is an object of the present invention to provide a position measuring apparatus that is less susceptible to aging, even in the presence of large temperature fluctuations, and that is compact, easily manufactured and assembled, and capable of highly accurate measurement.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
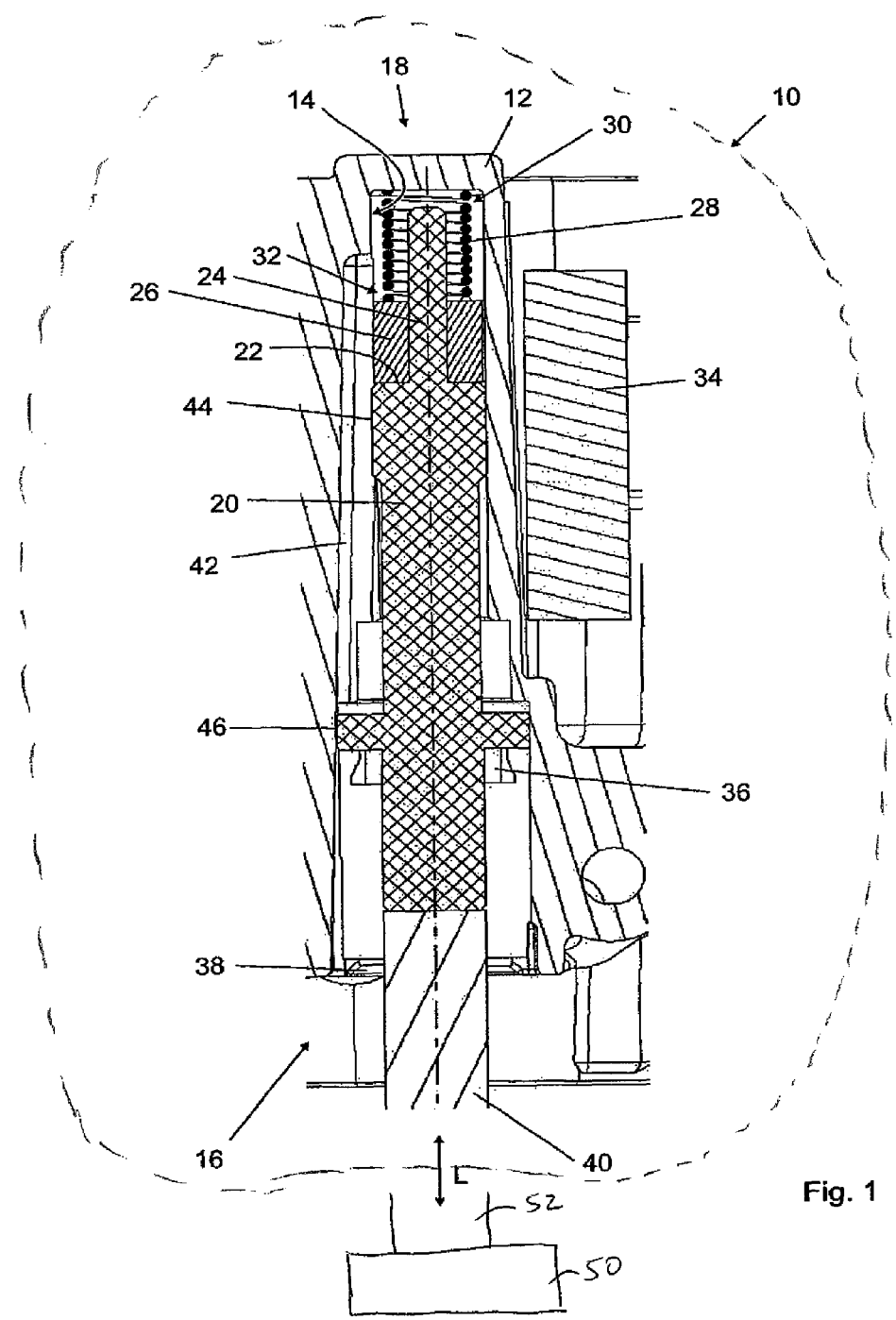
FIG. 1 is a cross sectional view taken through a position measuring apparatus in accordance with an embodiment of the present invention.

Referring now to the drawing figures, FIG. 1 shows a position measuring apparatus 10, which comprises a housing 12 and a sleeve 14 formed in the housing. Sleeve 14 is a cavity in housing 12, and, in portions, it has substantially cylindrical shape. Sleeve 14 has a first open end 16 and a second end 18, which is disposed opposite first end 16 and, in the present case, is closed.

A guide pin 20 that can move along a longitudinal direction L is mounted inside sleeve 14. Guide pin 20 has an end face 22, which faces second end 18. On end face 22, there is disposed a guide core 24, which represents an integral part of guide pin 20. Guide pin 20 can be produced as a plastic injection-molded member.

Guide core 24 is cylindrical and is disposed coaxially with the rest of guide pin 20. Guide core 24 passes centrally through an annular magnet 26 and protrudes beyond it. Annular magnet 26 can be turned freely around guide core 24.

A preferably helical spring 28 of stainless steel partly surrounds guide core 24 in longitudinal direction L and is braced with one end 30 against second end 18 of sleeve 14. By means of an end 32 disposed opposite end 30, helical spring 28 pre-compressed in this way exerts a force along longitudinal direction L on annular magnet 26, thus urging it against guide pin 20. Between annular magnet 26 and helical spring 28, an insulating washer can be disposed, which counteracts distortion of the magnetic field of annular magnet 26 by helical spring 28.

Preferably, annular magnet 26 has an outside diameter that is smaller by a small amount, especially by less than 100 μm, than an inside diameter of sleeve 14 at a point adjacent to the annular magnet. Also, preferably, helical spring 28 has an outside diameter that is smaller by a small amount, especially by less than 100 μm, than an inside diameter of sleeve 14 at a point adjacent to the helical spring.

A linear magnetic field sensor 34, which may also be described as a PLCD (permanent magnetic linear contactless displacement sensor), is disposed in housing 12. Magnetic field sensor 34 is disposed adjacent to annular magnet 26 and, together therewith, forms a sensor arrangement for sensing a position of guide pin 20 relative to housing 12.

Guide core 24 has a latching projection 36, which includes a plurality of partial latching projections 36.1, 36.2, . . . (see FIG. 2). Latching projection 36 cooperates with a latching bead 38, which is formed adjacent to open first end 16 of sleeve 14 on housing 12.

Figure 2:
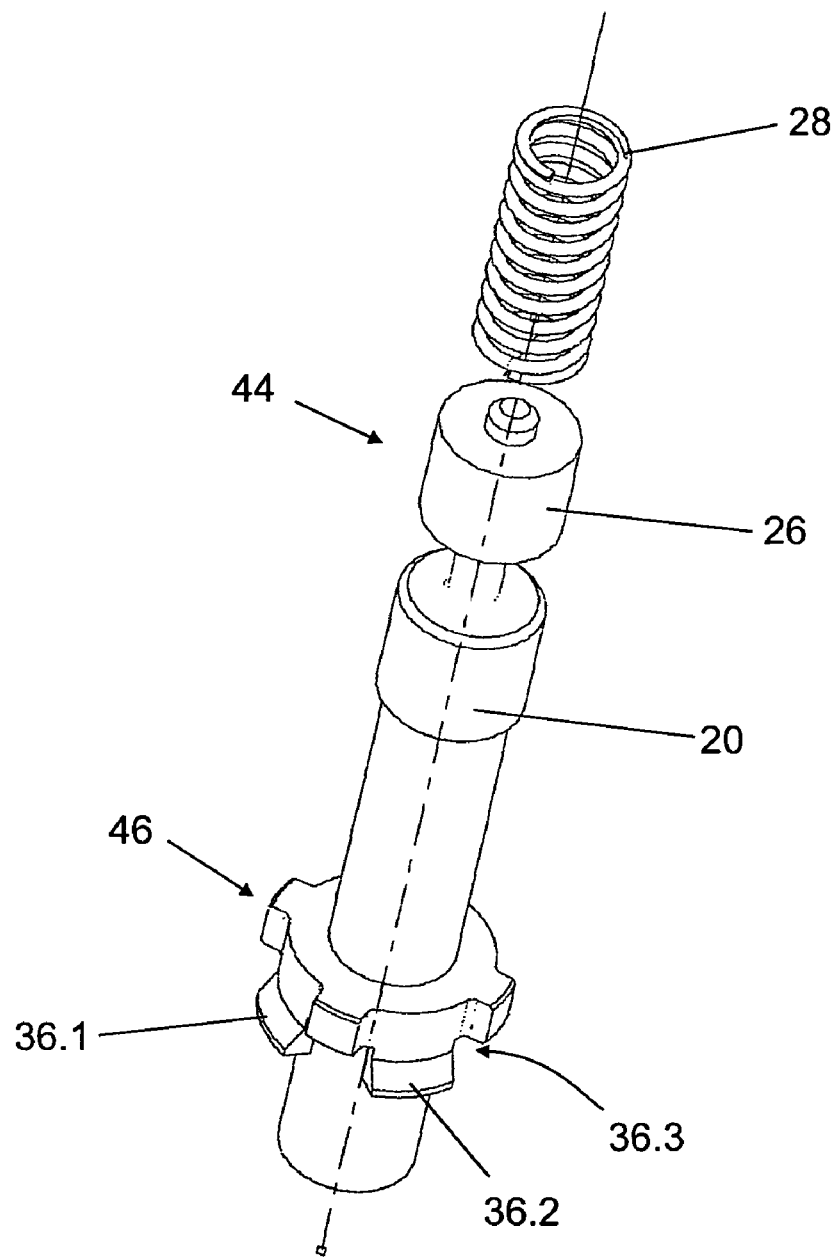
FIG. 2 is a perspective view of a spring, a magnet and a guide pin of an embodiment of the position measuring apparatus according to the present invention.

FIG. 2 shows guide pin 20, spring 28 and mounted annular magnet 26 in perspective.

Referring back to FIG. 1, a connecting rod 40 is schematically shown, which is in mechanical communication with a gear rod 52 of a gearbox 50. Whenever gear rod 52 is moved, connecting rod 40 and, thus, guide pin 20 are also moved. The position of annular magnet 26 relative to magnetic field sensor 34 is then changed. The position of annular magnet 26 relative to magnetic field sensor 34 is read out by an electrical control unit (not illustrated), which is electrically connected to magnetic field sensor 34. Guide pin 20 is in contact with the sleeve at two bearing points 44, 46, and is guided in this way. First bearing point 44 is located adjacent to guide core 24 and second bearing point 46 has a larger diameter than first bearing point 44 and is located adjacent to first end 16 in a widened portion of sleeve 14.

In accordance with an embodiment of the present invention, in a gearbox, connecting rod 40 is connected to guide pin 20. If necessary, oil is removed from sleeve 14 via an oil-bleed duct 42 formed in housing 12. Connecting rod 40 protrudes into housing 12 and, at the entry point, forms an annular gap 48, which represents the only aperture of sleeve 14 leading to the outside.

Magnet 26 is ideally manufactured from ferromagnetic material, and the other apparatus components are, for example, plastic injection-molded members. Since ferromagnetic materials and plastic have different coefficients of thermal expansion, they have different percentage elongations during temperature fluctuations. Because spring 28 is disposed between second end 18 of sleeve 14 and the magnet such that the spring urges the magnet against guide pin 20, the magnet can expand freely in longitudinal direction. Thus, the magnet always exerts a constant force on the guide pin, and, so, aging is avoided. In contrast, if a conventional clip or screw is used, the thermal expansion of the magnet relative to the guide pin exerts forces on the clip or screw connection, thus causing it to age.

The inventive position measuring apparatus can be easily assembled. In one method for assembling the position measuring apparatus, the spring is first introduced into the sleeve. Then the guide pin together with magnet mounted on the guide core is also introduced into the sleeve such that the guide pin, magnet and spring are substantially coaxial with one another.

Accordingly, the present invention provides a position measuring apparatus that wears only slightly even in the presence of large temperature fluctuations. Additionally, the inventive position measuring apparatus is compact, easily manufactured and assembled, and capable of highly accurate measurement.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A position measuring apparatus, comprising:
   a sleeve including an open first end and a second end disposed opposite said first end;
   a guide pin guided at least partly in said sleeve;
   a linear magnetic field sensor;
   a magnet disposed adjacent to said linear magnetic field sensor on a face of said guide pin facing said second end; and
   a spring disposed between said second end and said magnet to urge said magnet against said guide pin, wherein said magnet directly applies a constant force on said guide pin.

2. The position measuring apparatus according to claim 1, wherein said magnet is an annular magnet including a central aperture, and said guide pin includes a guide core extending through said central aperture.

3. The position measuring apparatus according to claim 2, wherein said annular magnet has an outside diameter that is smaller than an inside diameter of said sleeve at a point adjacent to said annular magnet.

4. The position measuring apparatus according to claim 3, wherein said outside diameter is smaller than said inside diameter by less than about 100 μm.

5. The position measuring apparatus according to claim 2, wherein said spring is a helical spring including an outside diameter that is smaller than an inside diameter of said sleeve at a point adjacent to said helical spring.

6. The position measuring apparatus according to claim 5, wherein said outside diameter is smaller than said inside diameter by less than about 100 μum.

7. The position measuring apparatus according to claim 5, wherein said annular magnet, said helical spring and said guide core are disposed coaxially.

8. The position measuring apparatus according to claim 1, wherein said sleeve includes a latching projection adjacent to said open first end to hold said guide pin in said sleeve.

9. The position measuring apparatus according to claim 8, wherein said guide pin includes a latching bead adjacent to said latching projection for cooperation with said latching projection.

10. The position measuring apparatus according to claim 1, further comprising a housing, said sleeve being formed in said housing, said linear magnetic field sensor being disposed in said housing.

11. A gear actuator, comprising a position measuring apparatus according to claim 1, and wherein said guide pin is connected to a gear rod at said first end.

* * * * *